US010542313B2

(12) United States Patent
Haberman et al.

(10) Patent No.: US 10,542,313 B2
(45) Date of Patent: *Jan. 21, 2020

(54) SYSTEM AND METHOD FOR OPTIMIZED CHANNEL SWITCHING IN DIGITAL TELEVISION BROADCASTING

(71) Applicant: Visible World, LLC, Philadelphia, PA (US)

(72) Inventors: Seth Haberman, New York, NY (US); Gerrit Niemeijer, Maplewood, NJ (US); Richard L. Booth, Bensalem, PA (US); Alex Jansen, New York, NY (US); Michael-Dennis Biemans, New York, NY (US)

(73) Assignee: Visible World, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/493,014

(22) Filed: Sep. 22, 2014

(65) Prior Publication Data

US 2015/0189374 A1   Jul. 2, 2015

Related U.S. Application Data

(63) Continuation of application No. 10/423,280, filed on Apr. 25, 2003, now Pat. No. 8,843,990.

(60) Provisional application No. 60/375,562, filed on Apr. 25, 2002.

(51) Int. Cl.
*H04N 21/438*   (2011.01)
*H04N 21/426*   (2011.01)
*H04N 5/50*   (2006.01)

(52) U.S. Cl.
CPC .......... *H04N 21/4384* (2013.01); *H04N 5/50* (2013.01); *H04N 21/42638* (2013.01)

(58) Field of Classification Search
CPC ............... H04N 21/435; H04N 21/235; H04N 21/4622; H04N 5/4401; H04N 7/088; H04N 5/44543; H04N 21/4345; H04N 21/482; H04N 21/84; H04N 21/4821; H04N 7/17318; H04N 21/23406; H04N 21/47202; H04N 21/6587; H04N 7/17336; H04N 5/60; H04N 5/505; H04N 5/44513; H04N 21/4884; H03G 3/348
See application file for complete search history.

(56) References Cited

U.S. PATENT DOCUMENTS

| | | |
|---|---|---|
| 3,366,731 A | 1/1968 | Wallerstein |
| 3,639,686 A | 2/1972 | Walker et al. |
| 4,331,974 A | 5/1982 | Cogswell et al. |

(Continued)

FOREIGN PATENT DOCUMENTS

WO   WO199832284   *   7/1998   ............... H04N 7/24

*Primary Examiner* — Benjamin R Bruckart
*Assistant Examiner* — Anthony Bantamoi
(74) *Attorney, Agent, or Firm* — BakerHostetler

(57) ABSTRACT

A system and method for masking/reducing the switch time from an analog or digital television channel to another digital television channel and back. Various optimizations which may be used individually or in combination to minimize the potential disruption to the viewer. This optimization is especially important when the channel switch is made automatically by the receiver, such as the case where the presentation of one television program is temporarily continued on another channel.

22 Claims, 8 Drawing Sheets

Dual-tuner situation

(56) References Cited

U.S. PATENT DOCUMENTS

| | | |
|---|---|---|
| 4,475,123 A | 10/1984 | Dumbauld et al. |
| 4,573,072 A | 2/1986 | Freeman |
| 4,602,279 A | 7/1986 | Freeman |
| 4,625,235 A | 11/1986 | Watson |
| 4,638,359 A | 1/1987 | Watson |
| 4,703,423 A | 10/1987 | Bado et al. |
| 4,716,410 A | 12/1987 | Nozaki |
| 4,789,235 A | 12/1988 | Borah et al. |
| 4,814,883 A | 3/1989 | Perine et al. |
| 4,847,698 A | 7/1989 | Freeman |
| 4,847,699 A | 7/1989 | Freeman |
| 4,847,700 A | 7/1989 | Freeman |
| 4,850,007 A | 7/1989 | Marino et al. |
| 4,901,147 A | 2/1990 | Tajima |
| 4,918,516 A | 4/1990 | Freeman |
| 5,099,422 A | 3/1992 | Foresman et al. |
| 5,105,184 A | 4/1992 | Pirani et al. |
| 5,155,591 A | 10/1992 | Wachob |
| 5,173,900 A | 12/1992 | Miller et al. |
| 5,220,501 A | 6/1993 | Lawlor et al. |
| 5,231,494 A | 7/1993 | Wachob |
| RE34,340 E | 8/1993 | Freeman |
| 5,253,940 A | 10/1993 | Abecassis |
| 5,260,778 A | 11/1993 | Kauffman et al. |
| 5,291,395 A | 3/1994 | Abecassis |
| 5,305,195 A | 4/1994 | Murphy |
| 5,343,239 A | 8/1994 | Lappington et al. |
| 5,347,632 A | 9/1994 | Filepp et al. |
| 5,356,151 A | 10/1994 | Abecassis |
| 5,361,393 A | 11/1994 | Rossillo |
| 5,377,354 A | 12/1994 | Scannell et al. |
| 5,414,455 A | 5/1995 | Hooper et al. |
| 5,422,468 A | 6/1995 | Abecassis |
| 5,424,770 A | 6/1995 | Schmelzer et al. |
| 5,426,281 A | 6/1995 | Abecassis |
| 5,434,678 A | 7/1995 | Abecassis |
| 5,442,390 A | 8/1995 | Hooper et al. |
| 5,442,771 A | 8/1995 | Filepp et al. |
| 5,446,919 A | 8/1995 | Wilkins |
| 5,448,568 A | 9/1995 | Delpuch et al. |
| 5,499,046 A | 3/1996 | Schiller et al. |
| 5,515,098 A | 5/1996 | Carles |
| 5,515,270 A | 5/1996 | Weinblatt |
| 5,519,433 A | 5/1996 | Lappington et al. |
| 5,526,035 A | 6/1996 | Lappington et al. |
| 5,537,141 A | 7/1996 | Harper et al. |
| 5,548,532 A | 8/1996 | Menand et al. |
| 5,550,735 A | 8/1996 | Slade et al. |
| 5,566,353 A | 10/1996 | Cho et al. |
| 5,584,025 A | 12/1996 | Keithley et al. |
| 5,585,838 A | 12/1996 | Lawler et al. |
| 5,585,858 A | 12/1996 | Harper et al. |
| 5,594,910 A | 1/1997 | Filepp et al. |
| 5,610,653 A | 3/1997 | Abecassis |
| 5,617,142 A | 4/1997 | Hamilton |
| 5,632,007 A | 5/1997 | Freeman |
| 5,634,849 A | 6/1997 | Abecassis |
| 5,636,346 A | 6/1997 | Saxe |
| 5,638,113 A | 6/1997 | Lappington et al. |
| 5,652,615 A | 7/1997 | Bryant et al. |
| 5,671,225 A | 9/1997 | Hooper et al. |
| 5,682,196 A | 10/1997 | Freeman |
| 5,684,918 A | 11/1997 | Abecassis |
| 5,696,869 A | 12/1997 | Abecassis |
| 5,717,814 A | 2/1998 | Abecassis |
| 5,717,923 A | 2/1998 | Dedrick |
| 5,724,091 A | 3/1998 | Freeman et al. |
| 5,724,472 A | 3/1998 | Abecassis |
| 5,724,521 A | 3/1998 | Dedrick |
| 5,732,217 A | 3/1998 | Emura |
| 5,734,413 A | 3/1998 | Lappington et al. |
| 5,740,388 A | 4/1998 | Hunt |
| 5,740,549 A | 4/1998 | Reilly et al. |
| 5,754,939 A | 5/1998 | Herz et al. |
| 5,758,259 A | 5/1998 | Lawler |
| 5,761,601 A | 6/1998 | Nemirofsky et al. |
| 5,764,275 A | 6/1998 | Lappington et al. |
| 5,768,521 A | 6/1998 | Dedrick |
| 5,774,170 A | 6/1998 | Hite et al. |
| 5,774,664 A | 6/1998 | Hidary et al. |
| 5,778,181 A | 7/1998 | Hidary et al. |
| 5,784,095 A | 7/1998 | Robbins et al. |
| 5,784,528 A | 7/1998 | Yamane et al. |
| 5,796,945 A | 8/1998 | Tarabella |
| 5,797,087 A * | 8/1998 | Lee .......... H04B 1/18 455/181.1 |
| 5,802,314 A | 9/1998 | Tullis et al. |
| 5,805,974 A | 9/1998 | Hite et al. |
| 5,825,884 A | 10/1998 | Zdepski et al. |
| 5,835,087 A | 11/1998 | Herz et al. |
| 5,861,881 A * | 1/1999 | Freeman .......... H04N 7/173 |
| 5,867,208 A | 2/1999 | McLaren |
| 5,873,068 A | 2/1999 | Beaumont et al. |
| 5,887,243 A | 3/1999 | Harvey et al. |
| 5,903,263 A | 5/1999 | Emura |
| 5,907,837 A | 5/1999 | Ferrel et al. |
| 5,913,031 A | 6/1999 | Blanchard |
| 5,917,830 A | 6/1999 | Chen et al. |
| 5,929,850 A | 7/1999 | Broadwin et al. |
| 5,931,901 A | 8/1999 | Wolfe et al. |
| 5,933,192 A * | 8/1999 | Crosby .......... H04N 21/4263 348/725 |
| 5,937,331 A | 8/1999 | Kalluri et al. |
| 5,978,799 A | 11/1999 | Hirsch |
| 5,986,692 A | 11/1999 | Logan et al. |
| 5,991,735 A | 11/1999 | Gerace |
| 6,002,393 A | 12/1999 | Hite et al. |
| 6,018,768 A | 1/2000 | Ullman et al. |
| 6,026,368 A | 2/2000 | Brown et al. |
| 6,029,045 A | 2/2000 | Picco et al. |
| 6,038,000 A | 3/2000 | Hurst, Jr. |
| 6,038,367 A | 3/2000 | Abecassis |
| 6,049,569 A | 4/2000 | Radha et al. |
| 6,067,348 A | 5/2000 | Hibbeler |
| 6,075,551 A | 6/2000 | Berezowski et al. |
| 6,108,486 A | 8/2000 | Sawabe et al. |
| 6,115,080 A | 9/2000 | Reitmeier |
| 6,118,498 A * | 9/2000 | Reitmeier .......... 348/725 |
| 6,137,834 A | 10/2000 | Wine et al. |
| 6,141,358 A | 10/2000 | Hurst et al. |
| 6,160,570 A | 12/2000 | Sitnik |
| 6,304,852 B1 | 10/2001 | Loncteaux |
| 6,327,574 B1 | 12/2001 | Kramer et al. |
| 6,330,286 B1 | 12/2001 | Lyons et al. |
| 6,343,287 B1 | 1/2002 | Kumar et al. |
| 6,357,042 B2 | 3/2002 | Srinivasan et al. |
| 6,360,234 B2 | 3/2002 | Jain et al. |
| 6,408,278 B1 | 6/2002 | Carney et al. |
| 6,411,992 B1 | 6/2002 | Srinivasan et al. |
| 6,424,991 B1 | 7/2002 | Gish |
| 6,449,657 B2 | 9/2002 | Stanbach et al. |
| 6,457,010 B1 | 9/2002 | Eldering et al. |
| 6,463,444 B1 | 10/2002 | Jain et al. |
| 6,463,585 B1 | 10/2002 | Hendricks et al. |
| 6,466,975 B1 | 10/2002 | Sterling |
| 6,502,076 B1 | 12/2002 | Smith |
| 6,567,980 B1 | 5/2003 | Jain et al. |
| 6,574,793 B1 | 6/2003 | Ngo et al. |
| 6,588,013 B1 | 7/2003 | Lumley et al. |
| 6,601,237 B1 | 7/2003 | Ten et al. |
| 6,611,624 B1 | 8/2003 | Zhang et al. |
| 6,671,880 B2 | 12/2003 | Shah-Nazaroff et al. |
| 6,678,332 B1 | 1/2004 | Gardere et al. |
| 6,681,395 B1 | 1/2004 | Nishi |
| 6,694,482 B1 | 2/2004 | Arellano et al. |
| 6,698,020 B1 | 2/2004 | Zigmond et al. |
| 6,728,965 B1 | 4/2004 | Mao |
| 6,735,628 B2 | 5/2004 | Eyal |
| 6,785,289 B1 | 8/2004 | Ward et al. |
| 6,806,909 B1 | 10/2004 | Radha et al. |
| 6,850,252 B1 | 2/2005 | Hoffberg |
| 6,857,024 B1 | 2/2005 | Chen et al. |
| 6,877,134 B1 | 4/2005 | Fuller et al. |
| 2001/0013123 A1 | 8/2001 | Freeman et al. |

(56) References Cited

U.S. PATENT DOCUMENTS

| | | | |
|---|---|---|---|
| 2001/0013124 A1 | 8/2001 | Klosterman et al. | |
| 2001/0056576 A1 | 12/2001 | Park et al. | |
| 2002/0013943 A1* | 1/2002 | Haberman et al. | 725/39 |
| 2002/0016961 A1* | 2/2002 | Goode | H04N 9/47 |
| 2002/0026359 A1 | 2/2002 | Long et al. | |
| 2002/0056093 A1 | 5/2002 | Kunkel et al. | |
| 2002/0057336 A1 | 5/2002 | Gaul et al. | |
| 2002/0083443 A1 | 6/2002 | Eldering et al. | |
| 2002/0092017 A1 | 7/2002 | Klosterman et al. | |
| 2002/0095676 A1 | 7/2002 | Knee et al. | |
| 2002/0144262 A1 | 10/2002 | Plotnick et al. | |
| 2002/0188943 A1* | 12/2002 | Freeman | G03C 1/26 |
| | | | 725/38 |
| 2002/0191116 A1* | 12/2002 | Kessler et al. | 348/723 |
| 2003/0063893 A1* | 4/2003 | Read | H04N 5/76 |
| | | | 386/46 |
| 2003/0110500 A1 | 6/2003 | Rodriguez | |
| 2003/0177503 A1 | 9/2003 | Sull et al. | |
| 2003/0196211 A1 | 10/2003 | Chan | |
| 2004/0025180 A1 | 2/2004 | Begeja et al. | |
| 2004/0111742 A1 | 6/2004 | Hendricks et al. | |
| 2004/0136698 A1 | 7/2004 | Mock | |
| 2005/0086691 A1 | 4/2005 | Dudkiewicz et al. | |
| 2005/0086692 A1 | 4/2005 | Dudkiewicz et al. | |
| 2005/0166224 A1 | 7/2005 | Ficco | |

* cited by examiner

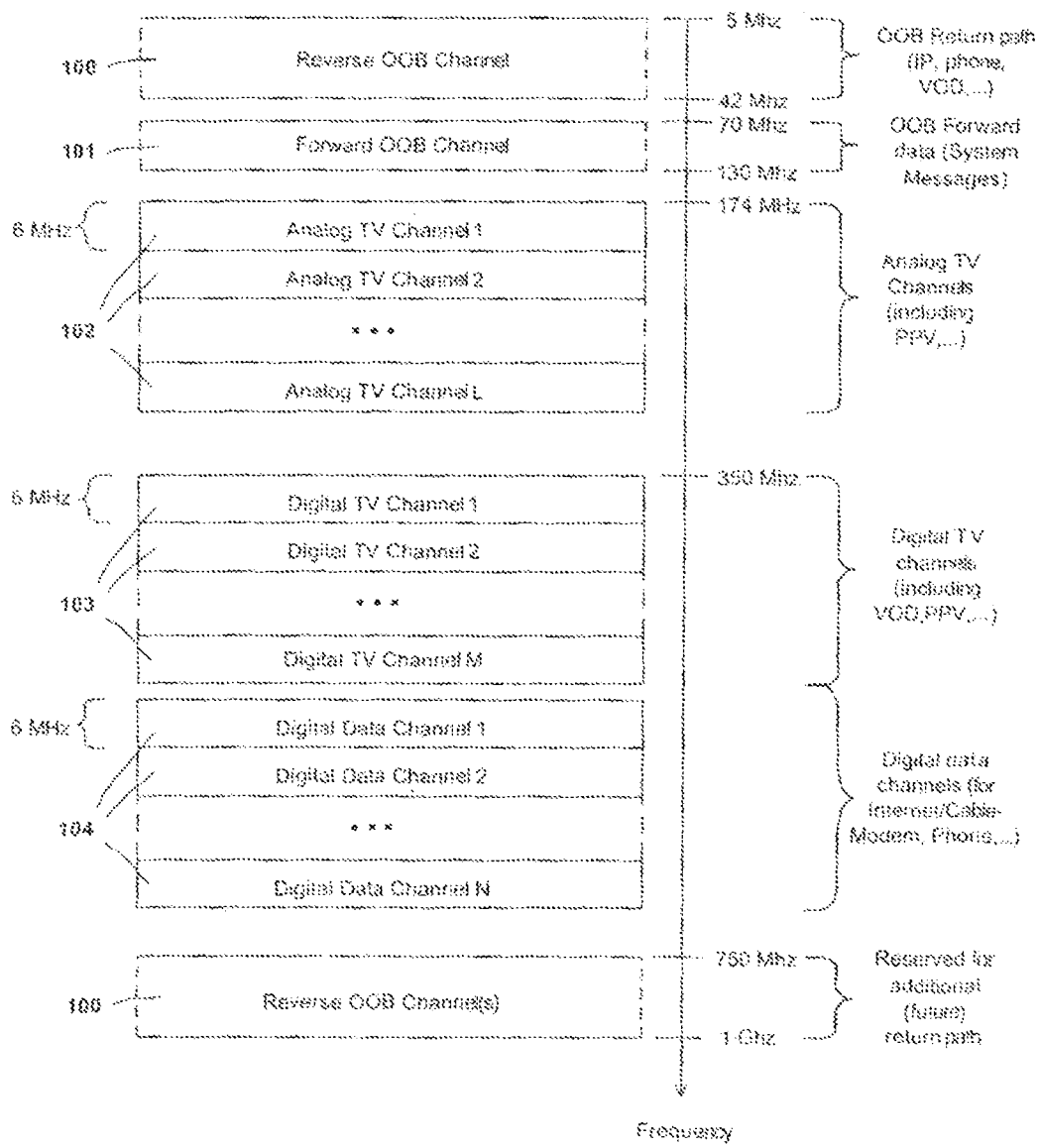
Figure 1: Example Television Channel lineup (map)

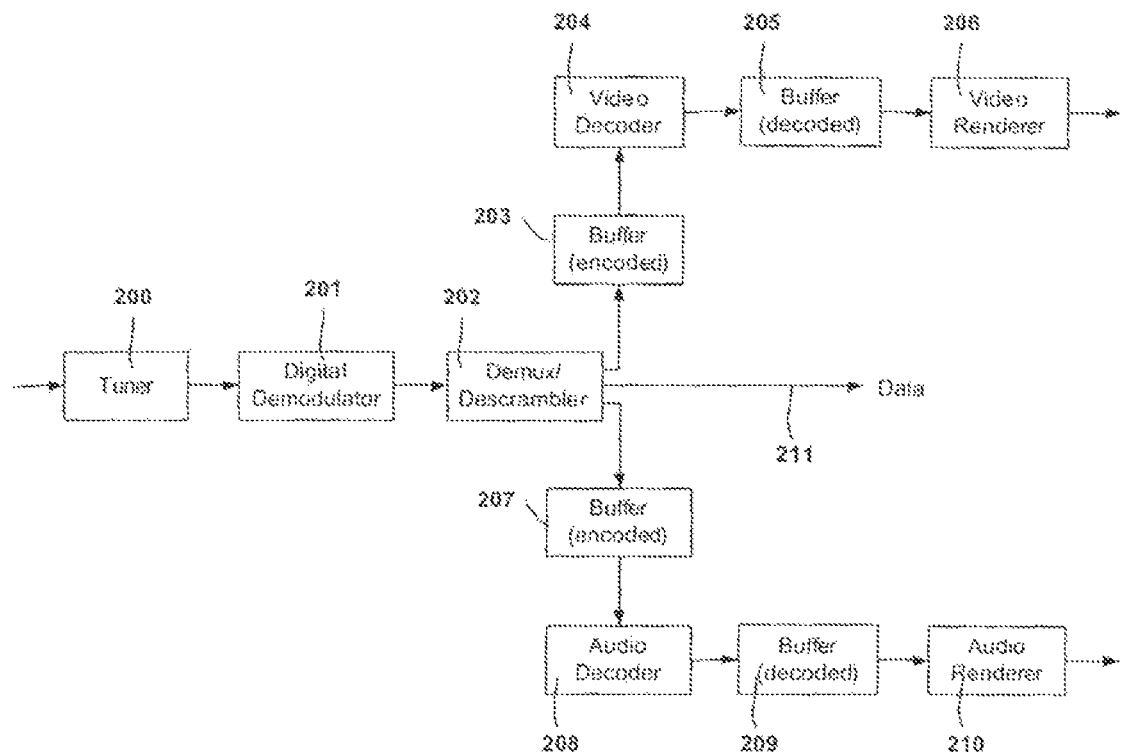
Figure 2: Block diagram for digital TV signal processing
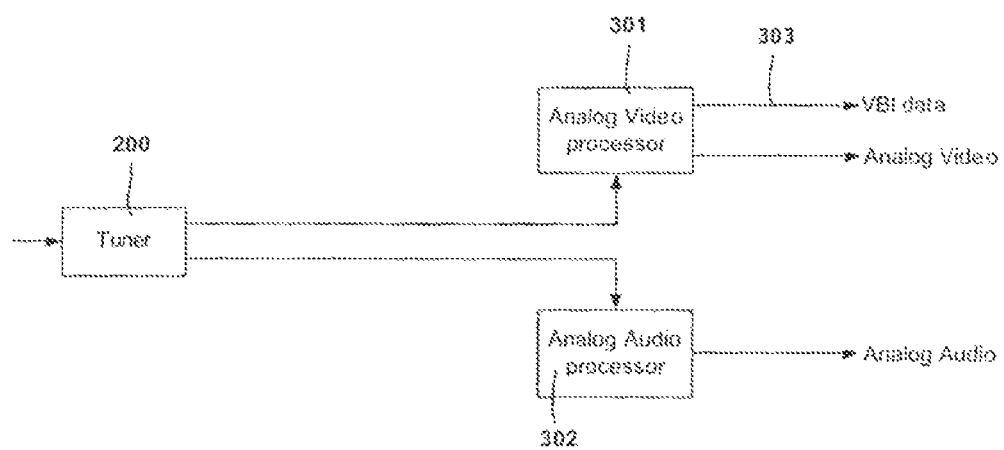
Figure 3a: Block diagram for analog TV signal processing

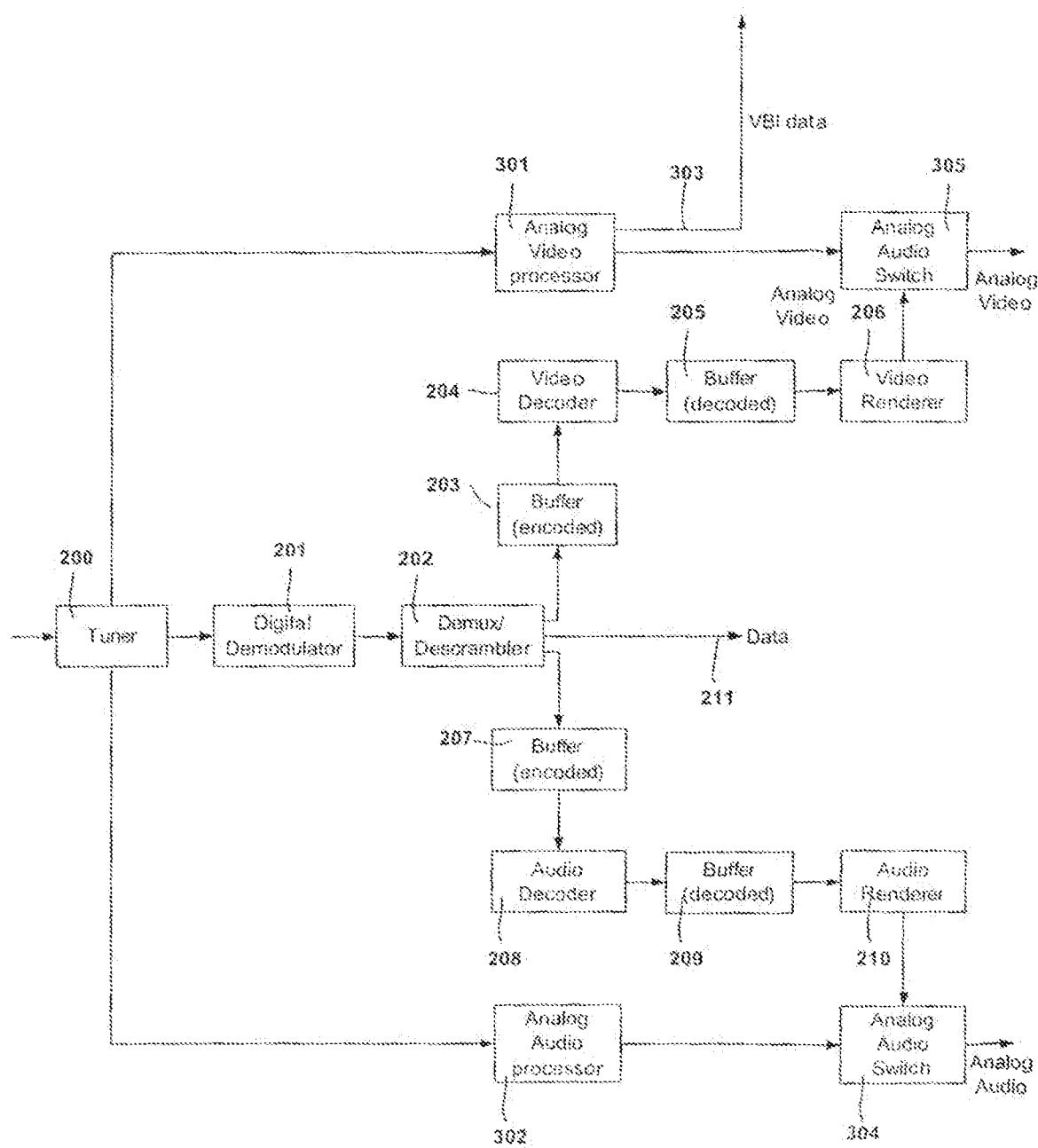
Figure 3b: Block diagram for combined analog/digital TV signal processing

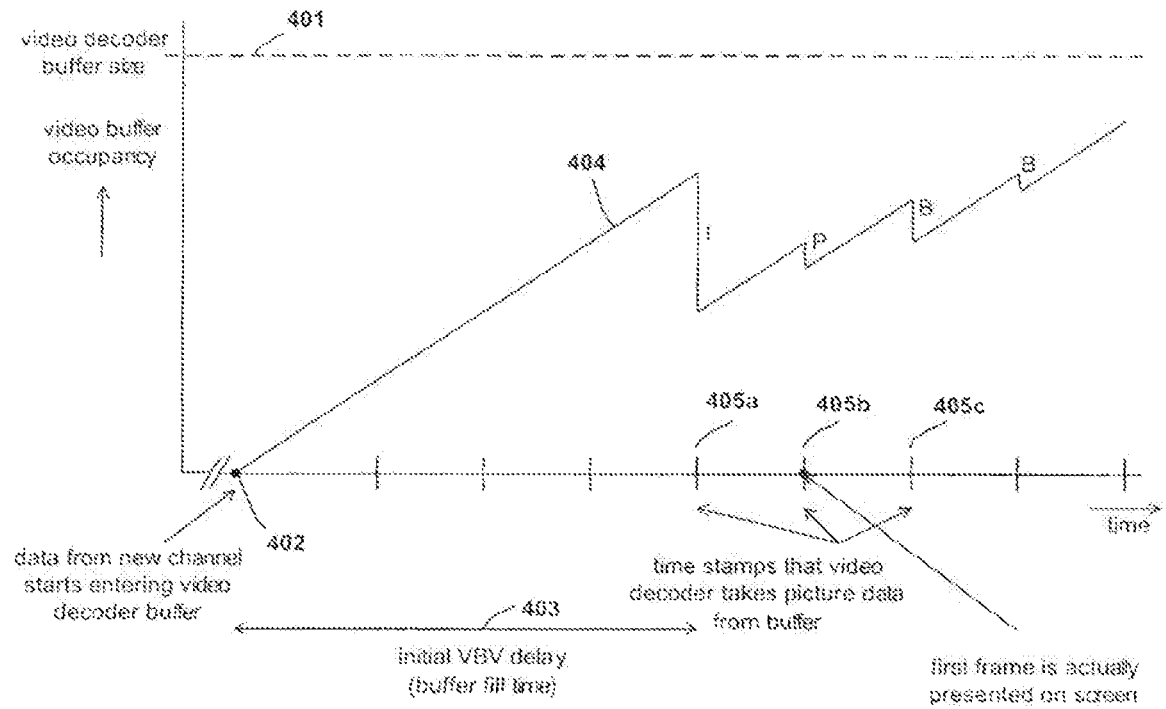
Figure 4: VBV graph - Start of new video coming in
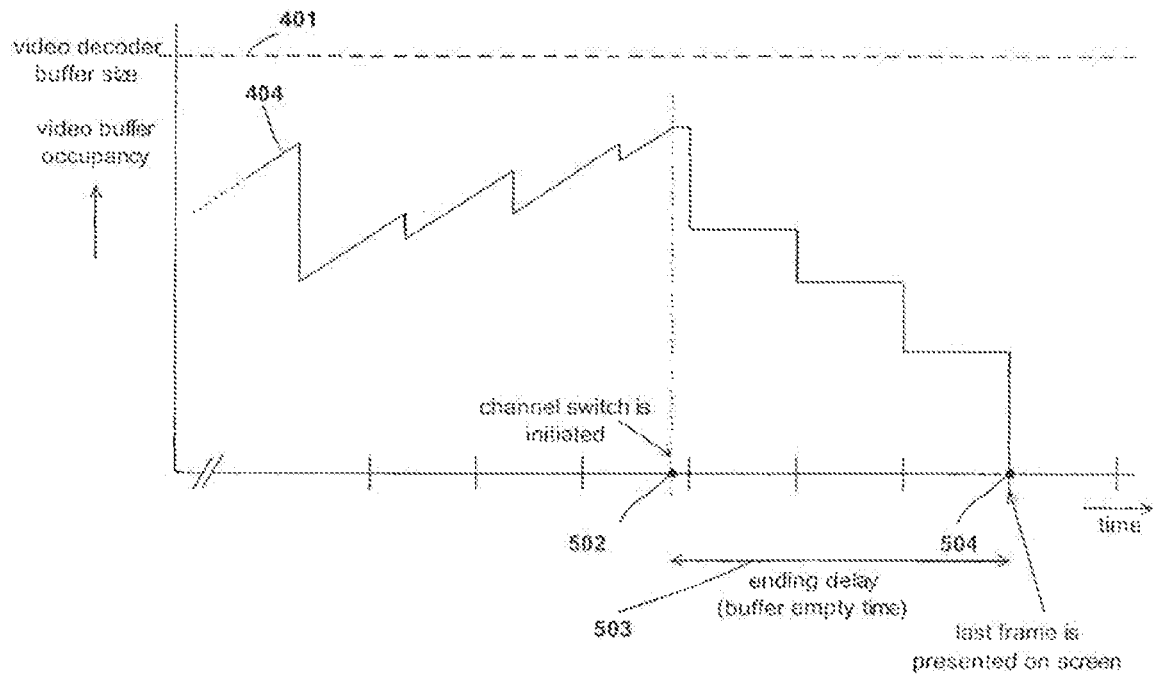
Figure 5: VBV graph - Just before and after channel switch

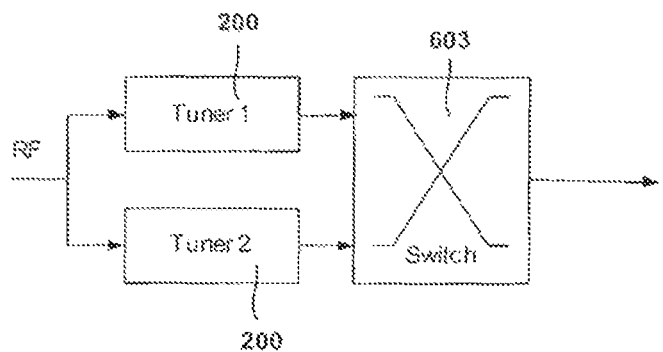
Figure 6: Dual-tuner situation
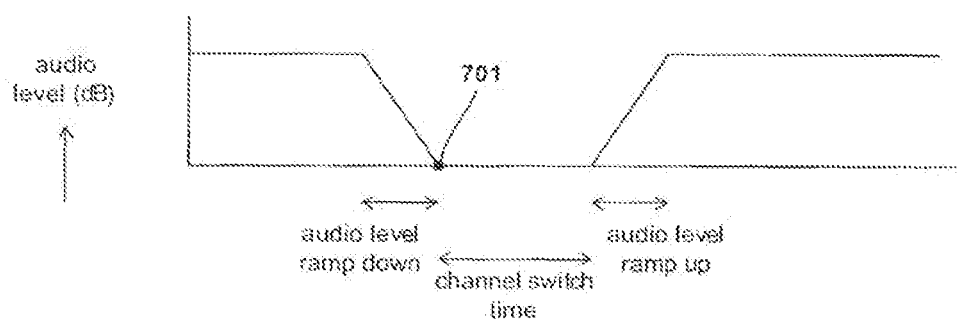
Figure 7: Audio ramp-down/up

Message Replacement

Duplication of Access-Control Messages

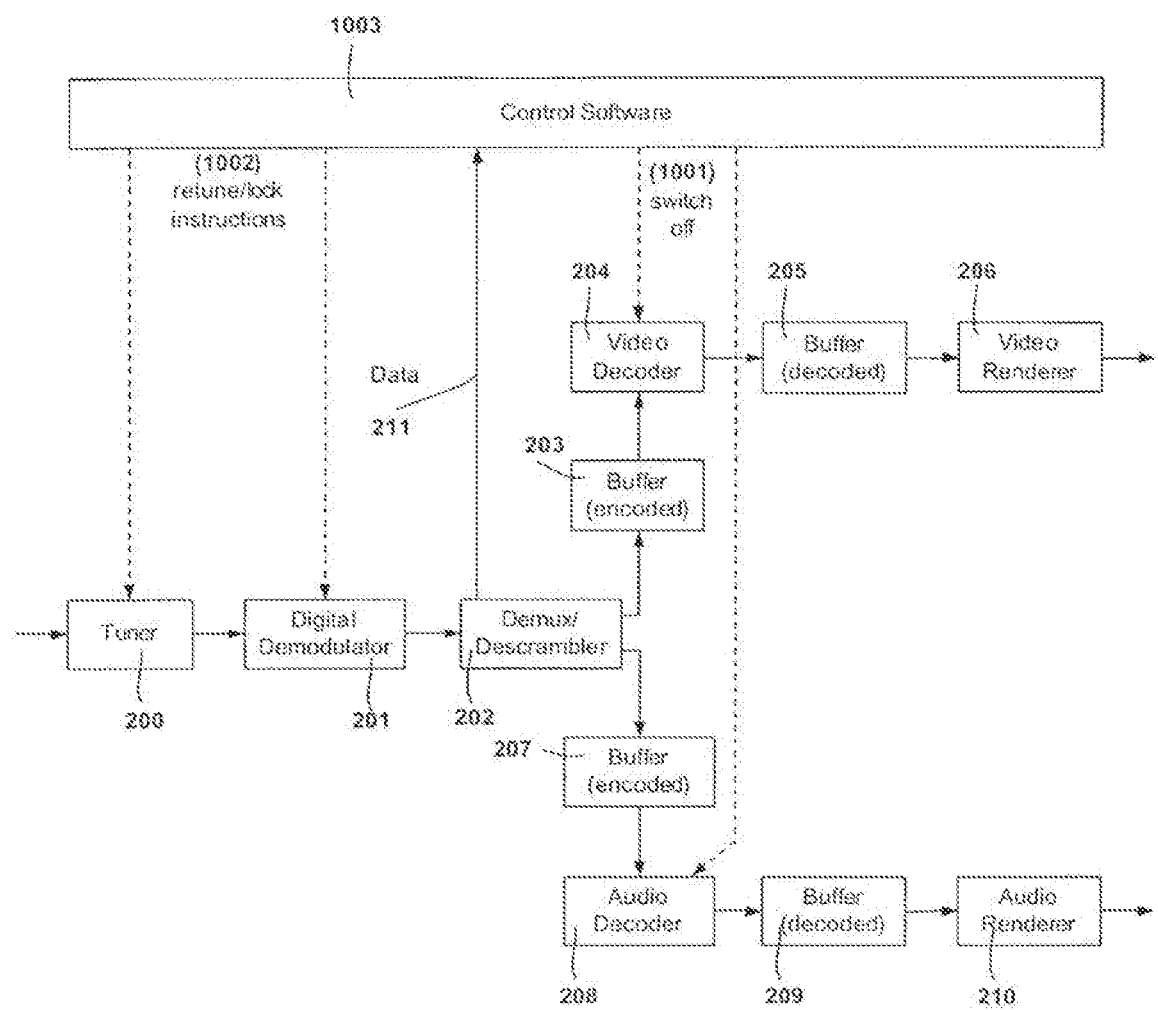
Figure 10: Channel Switching

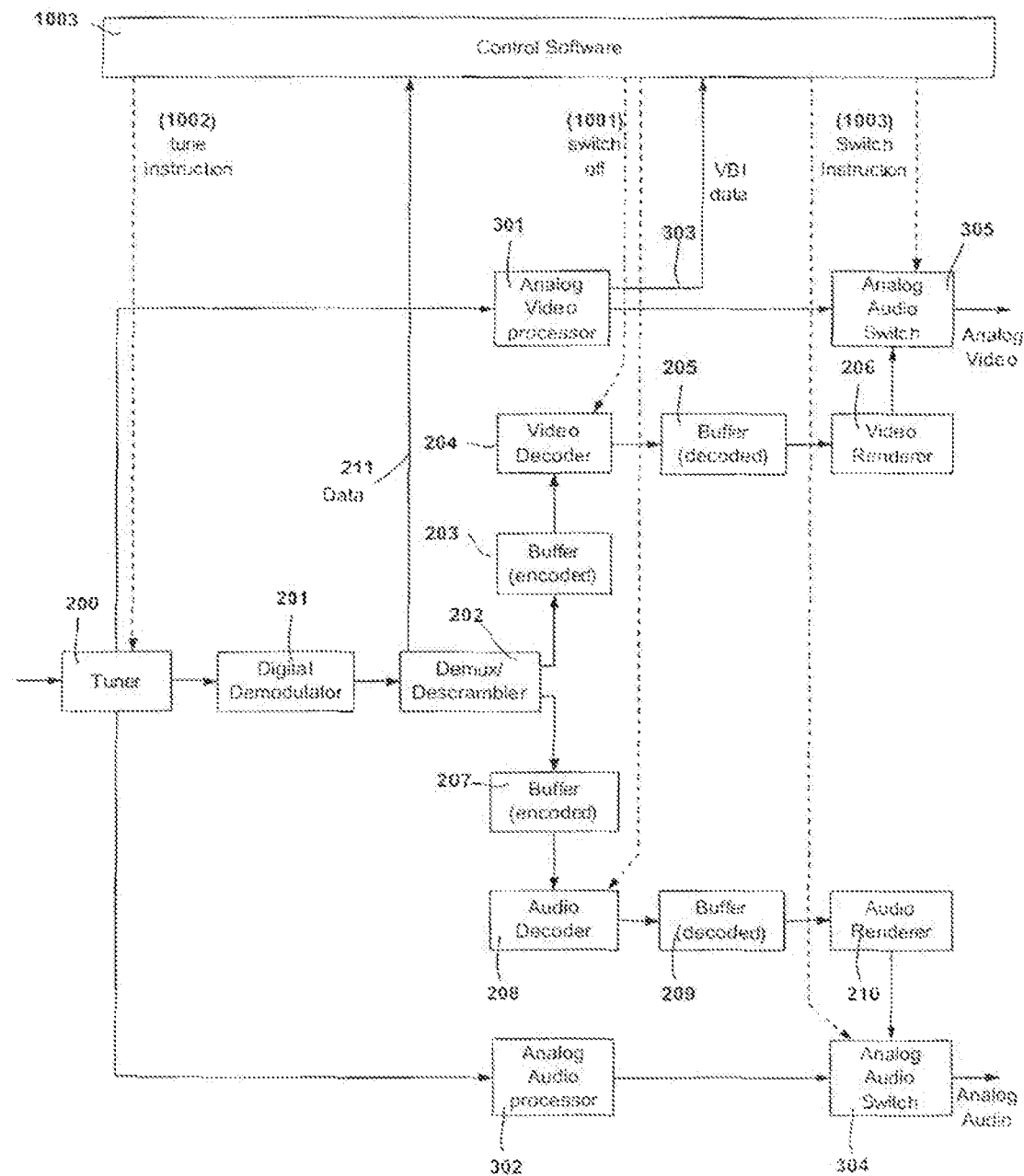
Figure 11: Digital to Analog channel Switching

SYSTEM AND METHOD FOR OPTIMIZED CHANNEL SWITCHING IN DIGITAL TELEVISION BROADCASTING

RELATED APPLICATIONS

This application is a continuation application of U.S. application Ser. No. 10/423,280, filed Apr. 25, 2003, which claims the benefit of U.S. Provisional Appln. No. 60/375,562, filed Apr. 25, 2002, each of which is incorporated herein by reference in its entirety.

FIELD OF THE INVENTION

This invention is directed towards digital television, and more particularly towards a method for switching between two television channels where at least one of the channels is digital.

BACKGROUND

Channel switching between television channels as being received by a television receiver (such as a television, a set-top box, . . . ) usually takes a certain amount of time, typically between 1.5 and 2 seconds, depending on the signal strength and reception hardware/software. During this switch time the video is usually black (blanked) and the audio is silent.

In normal situations, where the viewer triggers the channel switch (e.g., by pressing channel up/down buttons on the remote control), this period of silence/blackness is no problem since it is expected by the viewer, and also because the television programs that are being switched between have no relation between each other (are independent). In such a situation it is still desirable, however, to reduce the switch time (which is defined here as the time between presentation of the last video/audio from one (source) channel and the presentation of the first video/audio front the channel that is switched to).

In situations where the channel switch is made autonomously by the television receiver, for example because the presentation of one program is temporarily continued on another channel it is more important that the switch time is as short as possible, since the switch disrupts the flow of the presentation and the viewer's experience since (s)he does not expect a switch to happen. An example of such a situation is described in the Visible World patent application "System and Method for Simultaneous Broadcast for Personalized Messages", filed on Apr. 24, 2001 with application Ser. No. 09/841,465 and is incorporated hereto by reference, which describes how to implement personalized messaging in a broadcast environment in a highly bandwidth efficient manner by using modular (slot-based) messages. In one embodiment, personalized messages are concentrated in one (or a few) dedicated digital streams, so that existing analog and digital television channels can "share" personalized messages by switching to and from these dedicated channels at the appropriate times. This leads to a highly bandwidth efficient system since the personalized messages are time-shared on one (or a few) channels.

The present invention describes methods for reducing the channel switch time from an analog or digital channel to a digital channel, and back.

Note that the related Visible World patent application "System and Method for Seamless Switching", filed on Dec. 13, 2000 with application Ser. No. 09/735,983 and incorporated herein by reference, explains how to seamlessly switch between content elements (modules of personalized messages) within a digital stream. The present application discloses methods on how to seamless switch to such a digital stream from another analog or digital stream and back.

SUMMARY

The present invention addresses issues around masking the switching from an analog or digital television channel (located at a certain frequency in the frequency spectrum) to another, digital, television channel (located at a different frequency in the frequency spectrum) and back. In normal television broadcasting, channel 'zapping' between two unrelated channels can take up to 2 seconds in time, while the TV set (or set top box, STB) is performing the channel switch.

The present invention includes general methods to reduce such switch time, as well as specific methods that can be employed in situations where there is a relation between the channels that are being switched between.

The general methods involve using audio/video data in digital audio/video decoder buffers at the moment the switch is being made to cover up at least the tuning and demodulating parts of the switch time.

The specific methods involve the preparation/conditioning of the digital target stream (that is being switched to) such that playout of its audio/video can start faster than in the general case, by exploiting how video is encoded.

An illustrative embodiment of the present invention is described that inserts a personalized message, such as a commercial, in a television program in a bandwidth efficient manner.

An illustrative embodiment of the present invention for a broadcast television receiver including a tuner for selecting one channel from multiple channels and an encoded media buffer for receiving digital encoded media from a channel selected by the tuner, includes a method of switching from a first digital channel to a second channel. The method includes inputting digital encoded media from the fast digital channel selected by the tuner to the encoded media buffer, then halting input of digital encoded media from the first digital channel to the encoded media buffer, while continuing to output digital encoded media from the first digital channel from the encoded media buffer. This also includes switching the tuner to the second channel, and after a passage of time for the tuner to complete switching to the second channel, outputting the second channel from the tuner. If the second channel is a digital channel, then outputting the second channel from the tuner includes commencing input of digital encoded media from the second channel to the encoded media buffer. If the second channel is an analog channel, then outputting the second channel from the tuner includes bypassing the encoded media buffer.

The present invention also includes situations wherein the passage of time for the tuner to complete switching to the second channel is a predetermined amount of time, and a quantity of digital encoded media in the encoded media butter is maximized to cover a maximal amount of the predetermined amount of time. This minimizes the amount of time the viewer sees no media. The present invention also includes attenuating audio for the first channel before switching the tuner to the second channel, increasing audio volume for the second channel afterwards.

When the media is digital video, and the second digital channel is an MPEG encoded channel, an illustrative embodiment includes creating the second digital channel such that after switching the tuner to the second channel, upon commencing input of digital encoded video from the second digital channel to the encoded video buffer, the first input into the encoded video buffer is a complete MPEG closed Group of Pictures (GOP). This avoids the system needing to wait for a GOP (I-frame). Alternatively, digital video can be previously encoded such that a VBV-delay of a first video frame in presentation order is reduced. This may be accomplished by increasing the video bitrate, and/or reducing a VBV buffer size maximum value for an encoder.

Another illustrative embodiment includes sending at least one control message for the second channel to the broadcast television receiver at a time before switching (or completion of switching the tuner to the second channel. This avoids the system needing to wait for control messages to appear in the channel that has been switched to.

The present invention works whether the media is video, MPEG encoded video, audio, MPEG encoded audio, or AC-3 encoded audio. An illustrative embodiment of a broadcast television receiver (included full television set, set top box etc.) includes a tuner, to select one channel from multiple channels received by the receiver. It also includes a digital encoded media buffer coupled to the tuner; the digital encoded media buffer to receive digital encoded media when a first digital channel is selected by the tuner. Other components may be positioned between the tuner and the digital encoded media buffer, such as switches, digital demodulator, demux/descrambler etc. When the tuner is switching to a second channel, the digital encoded media buffer ceases to receive digital encoded media for the first digital channel, but continues to output digital encoded media for the first digital channel through an output. After the tuner has completed switching to the second channel, if the second channel is a digital channel then the digital encoded buffer receives digital encoded media for the second channel. If the second channel is an analog channel, then output from the tuner bypasses the digital encoded media buffer.

An advantage of the present invention is the ability to provide a television viewer with an uninterrupted presentation, without long periods of silence/blackness while the channel switches are being performed by the receiver. The television viewer is minimally impacted during such changes, and may not even notice. Even if such channel switches are not completely masked, the present invention allows minimization of the effect of such channel changes.

An additional advantage of the present invention is the ability to distribute portions of a television program between different channels to achieve bandwidth-efficiency.

BRIEF DESCRIPTION OF THE DRAWINGS

The foregoing and other features and advantages of the present invention will be more fully understood from the following detailed description of illustrative embodiments, taken in conjunction with the accompanying drawings in which:

FIG. 1 illustrates an example of a television channel lineup (frequency map).

FIG. 2 illustrates the logical components on the digital signal path in a digital television receiver.

FIG. 3a illustrates the logical components on the analog signal path in a television receiver.

FIG. 3b illustrates the logical components of signal paths in a digital/analog television receiver.

FIG. 4 illustrates the buffer fullness graph of an MPEG video decoder buffer at the beginning of playback (e.g., after a channel switch is complete).

FIG. 5 illustrates the buffer fullness graph of an MPEG video decoder buffer at the end of playback (e.g., when a channel change is requested).

FIG. 6 illustrates the addition of an additional tuner in the television signal path to reduce the period of silence/blackness during a switch.

FIG. 7 illustrates audio ramp up/down when making a channel switch.

FIG. 10 illustrates channel switching process in a digital receiver, and

FIG. 11 illustrates channel switching process in a digital/analog receiver.

DETAILED DESCRIPTION

Figure 8:
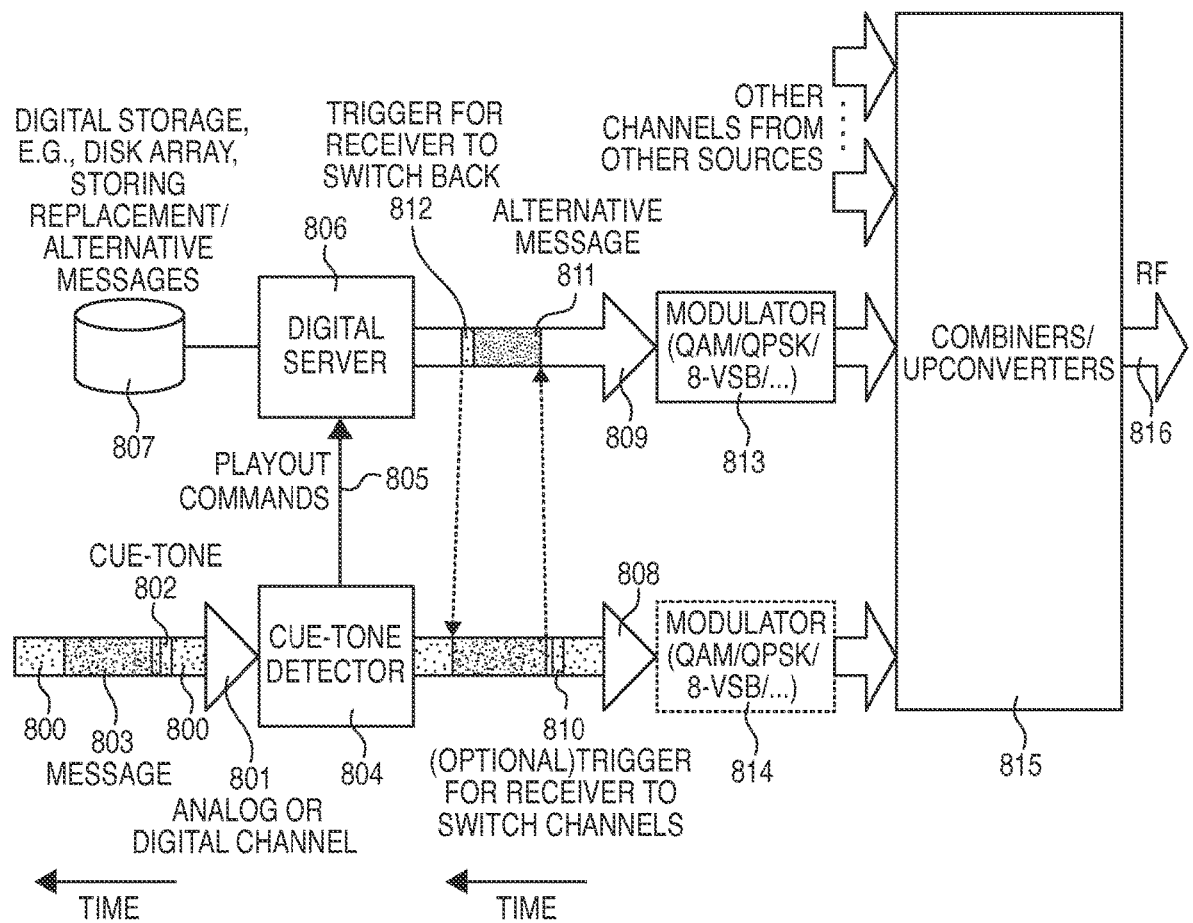
FIG. 8 illustrates a broadcast television headend system that allows digital receivers to replace a default message in a current television channel by an alternative message on another channel.

The present invention finds utility in various data transmission applications including, but not limited to, transmission, reception and decoding of broadcast television signals (whether distributed via cable, terrestrial, satellite, microwave, etc.); encoding, multiplexing, and decoding of MPEG (Moving Pictures Expert Group) and AC-3 (Audio Coding algorithm, third generation) based multimedia streams. The invention is both applicable in distribution of television signals to the consumer homes as well as distribution from a originator to affiliate stations (such as cable headends).

Frequency Maps

Television programming (as well as other content) distributed via a television distribution system, is carried to the consumer's homes via a plurality of frequency-multiplexed channels. Figure 1 shows a typical example of the subdivision of the frequency spectrum in a cable television system. The frequency spectrum in this example contains:

A plurality of analog television channels 102. Each channel conveys exactly one single analog television program (or pay-per-view movie, etc.)

A plurality of digital television channels 103. Each channel conveys a plurality of televisions programs, depending on the amount of compression used (typical is 6-10 programs in one channel). Such programs can also be pay-per-view movies, VOD (video On Demand) movies, etc. Digital channels contain television programs that are digitized, compressed, and multiplexed (using techniques such as MPEG), and the resulting bit stream is then mapped on a certain frequency band (channel) for distribution using modulation techniques such as QAM (Quadrature Amplitude Modulation), QPSK (Quadrature Phase Shift Keying), 8-VSB (8-level Vestigial Side Band), COFDM (Coded Orthogonal Frequency Division Multiplexing), etc.

A plurality of digital data channels 104. Data channels are assigned to carry data traffic such as Internet data (e.g., for DOCSIS modems), telephone traffic, etc.

Forward Out-Of-Band portions 101 assigned to forward traffic, e.g., used to control television receivers (send time updates, send conditional access control messages, IP traffic. receiver specific messages, etc.) Such traffic is typically modulated differently than the digital television channels. This data is also known as 'Out-Of-Band' traffic.

Reverse Out-Of-Band portions 100 assigned to return traffic (e.g., VOD control commands, telephone data, IP data, etc.).

Note that the example is specific to a US Cable network, yet a similar picture could easily be derived for other networks such as Satellite DTH, Terrestrial, Non-US Cable, Distribution Networks for Broadcasters (e.g., to affiliate stations), etc. Some television broadcast systems have return paths, others have not. Some have analog channels, some are only digital.

Common for a single distribution systems is that all (non-OOB) forward channels are carried in frequency bands of a fixed size (6 MHz in FIG. 1 is typical for the USA, while other sizes, such as 8 MHz can be seen in Europe).

In a system utilizing the present invention at least one of the channels will be digital, and the receiver unit must be capable of receiving and decoding digital television signals. Such a receiver is typically a digital consumer set-top hex (STB) or a digital television set. Alternatively, it can be a commercial receiver as placed in headends of television broadcast networks. Such commercial decoders receive digital signals from their point of origination and manipulate these signals for further distribution down the network.

Digital Television Receivers

The digital signal processing path in a digital receiver is illustrated in FIG. 2.

- Tuner 200 is responsible for selecting the frequency band at which the desired program is carried. For Cable Receivers this may be a QAM tuner, for Satellite a QPSK tunes, etc. The tuner produces an analog signal (sometimes called Intermediate Frequency, or IF) that goes into the demodulator 201.
- Demodulator 201 is responsible for demodulating the incoming signal based on the specific modulation scheme used (QAM-64, QAM-256, QPSK, etc.). The demodulator extracts (demodulates) the digital signal from the analog signal, and passes that digital signal (typically an MPEG-2 transport stream or a variant thereof) on to the Demux/Descrambler 202.
- Demultiplexer/Descrambler 202 is responsible for selecting the desired audio, video, and data from the incoming bitstream, and (if scrambled) de-scrambling it. The Demux/Descrambler produces unscrambled, encoded, digital audio and video streams. It also extracts data-messages 211 from the incoming stream. Audio is typically encoded in AC-3 or MPEG formats. Video is typically encoded in MPEG format. The streams as output by the Demux/Descrambler go into a video buffer 203 and an audio buffer 207.
- Video decoder 204 reads from the encoded video buffer, decodes the video, and writes the resulting uncompressed video to a buffer 205. The audio decoder 208 does the same for audio, and puts it in a buffer 209.
- Video renderer 206 reads from the uncompressed video buffer, and renders the video in a timely fashion (one frame every frame time, e.g. 29.97 times per second in NTSC (National TV Standards Committee)). The output of the renderer typically is an (analog) television video signal that can be displayed on a television screen. The audio renderer 210 in a similar fashion reads uncompressed digital audio from the buffer 209 and generates a conventional analog audio signal that can be input to standard consumer audio equipment such as an audio amplifier.

It should be noted that this diagram identifies the logical components that participate in the basic digital signal flow. In real implementations some of these functions may be combined (e.g. tuner and demodulator into one chip) and/or implemented in hardware or software (for example, the video decoder can be a hardware device or a software program, or combination thereof).

Most digital television receivers also support the reception of analog channels. This is specifically true in situations where analog and digital channels co-exist (for instance in a cable network where analog and digital programs are carried on the same cable infrastructure (as depicted in FIG. 1), or in direct-to-home, where the digital channels are carried on satellite and the analog channels are carried terrestrial in an entirely different part of the frequency domain.

The signal path for reception of analog channels only is shown in FIG. 3. Depending on the modulation scheme used, the tuner 200 can be shared with the digital signal path (the tuner output is switchable to the analog or digital signal path), or it can be separate (such as in the direct-to-home case).

- Tuner 200 is responsible for tuning to the frequency band that the program is carried at. The tuner produces analog signals (video, audio, and data such as Closed Caption in the USA or Teletext in Europe carried in the VBI interval).
- Video processor 301 receives the analog video signal and converts it into a displayable format. This might include descrambling, color decoding, 50-100 Hz conversions, etc. Similarly, audio processor 302 receives the analog audio signal and converts it into a standard format that can be put onto speakers or can be fed into audio equipment.

Note that the processors 301 and 302 might be split-up into multiple smaller physical components. Alternatively they might be integrated into one big unit (e.g., one single chip).

FIG. 3b shows the combination of analog and digital signal paths in an analog/digital television receiver. Also shows in this Figure are switches 304 and 305 in the backend, which are used to select which signals (either from the digital path or from the analog path) to output.

Channel Switching

Here and in the remainder of this disclosure, channel switch time is defined as the time between presentation of the last video frame/audio sample front one (source) channel and the presentation of the first video frame/audio sample from the channel that is switched to.

In the generic case, when switching from any (analog or digital) channel to an analog channel, the following steps take place in a television receiver:

1. Before actually timing, the receiver switches off the video and audio processors 301 and 302 and thus turns the output signals to black/silence.
2. The tuner selects (re-tunes to) the new frequency.
3. The processors start processing and rendering the audio and video (via processors 301 and 302) as soon as the output signal of the tuner is stable.

The typical amount of time necessary for changing to an analog channel can range between 200 and 1000 msec (or more), mainly depending on the quality of the signal and the tuner hardware/software.

Switching from any (analog or digital) channel to a digital channel involves considerably more steps in the general case:

1. Before actually tuning, the receiver switches off (and resets) the video 204 and audio decoders 208 and thus turns the output signals to black/silence.
2. The tuner 200 selects (re-tunes to) the new frequency and the demodulator 201 synchronizes on the incoming stream (in the Cable case this is called a "QAM lock"). This step can take anything between 200 msec up to 1000 msec (or more), depending on the tuner/demodulator hardware, the software controlling the tuner/demodulator, and the quality of the incoming signal.

3. The Demux/Descrambler 202 extracts a number of basic control messages from the stream. These control messages describe the contents of the digital stream in terms of program numbers, location of the program audio/video, etc. The messages enable the receiver to "find" the requested television program in the multiplex. In MPEG-2 systems these would for instance be the PAT (Program Association Table) and PMT (Program Map Table) messages. The typical time needed to find such message is on average around 20 msec, but can be as much as 50 msec since these messages appear in the bitstream at fixed time intervals.

4. Next, the decoders 204, 208 synchronize on the incoming video/audio streams. For instance in an MPEG-2 system the video decoder 204 has to wait for the next I-frame before it can start filling the encoded data buffer 203. All data before that first I-frame must be discarded. Since the interval between two subsequent I-frames can be as much as 18 frames (or more) in typical encoded MPEG video, the average wait time can be as much as 9 frames (300 msec). For the worst case, the wait time can be more than half a second.

5. The buffers 203 and 207 holding encoded (compressed) data will have to be filled to a certain extent before decoding can start, in order to avoid buffer underflows. For instance in an MPEG-2 system, the video buffer 203 will have to be filled according to the initial VBV delay of the first frame. This can be as much as 300-400 msec in conventionally encoded MPEG video, depending on the bitrate chosen. The VBV buffer fillrate 404 at the start of a new stream is illustrated in FIG. 4. This Figure shows a VBV buffer graph for a video decoder with buffer size 401 (e.g., 224 Kbyte). At time 402 new valid data starts entering the buffer. At time 405a the first frame of encoded data is taken out of the buffer by the video decoder. In total, it takes a time 403 until this first frame is taken out of the buffer.

6. The decoders 204, 208 can now start decoding video and audio, and next the renderers 206, 210 can start rendering video and audio. In case the first frame in decoding order is not the first one in presentation order an additional frame time must pass before actual frames are available for display. In FIG. 4, for example, it could be that the P frame at time 405b is the first frame to be presented. The I frame that is taken out of the buffer at time 405a (i.e., the first in decoding order) appears later in the presentation order.

As can be seen, the switch time to a digital channel can take a considerable amount of time, and can be as much as 2 seconds or more (especially if SW control overhead is included). Switching to an analog channel typically takes less time since no extensive digital processing steps have to be performed, but can still be up to 1.5 seconds of time as explained above.

Such long delays between changing channels (and having no video/audio present) is disruptive to the experience of the viewer and should be minimized. This holds for the general case of channel zapping, but even more in cases where the programming on the different channels is related.

The present invention discloses methods that can be used to reduce and/or mask the time needed for the switch. The invention focuses on methods that can be applied to today's digital television receivers (set-top boxes, commercial receivers, or other) without hardware modifications.

It should be noted that the methods described in this document work for both directed channel change (e.g. channel change initiated by the system, rather than the local viewer), and for more standard viewer initiated channel change (zapping).

The methods will work for all situations where a digital receiver is deployed, be it a receiver in the home (e.g. set top boxes, digital television sets, etc.) or a receiver in the distribution network (e.g. commercial receiver at cable plant, commercial receiver at local broadcasting station, etc.).

In the general case (basically the normal situation of a viewer, or the box autonomously, zapping between two channel) there are a few opportunities for masking/reducing the switch time as perceived by the viewer.

Method 1 (General): Dual Tuner Receivers

The first method to reduce the switch time works in receivers with two tuners as depicted in FIG. 6. Using this method, the second tuner tones to the new desired channel (frequency), while the first tuner stays on the original frequency. Only after the second tuner is tuned and has a stable signal, the system switches to the output of the first tuner, using a programmable switch 603. This solution will provide continuous playback in the system while the second tuner is tuning, thus reducing the amount of silence/blackness observed by the viewer. This solution works regardless from the type of switch (analog or digital to analog or digital).

When the switch is from an analog to a digital channel (or vice-versa) and the system has separate tuners for analog and digital channels, the signal paths are essentially separate, and only at the backend of the system it is decided which signal to route to the outputs of the receiver via switches 304 and 305. In this situation the solution to reducing the amount of silence/black when switching from analog to digital or from digital to analog is making the switch in the backend only AFTER the new signal path is producing audio/video, thus essentially reducing the switch time to zero.

Method 2 (General): Using Digital Video Buffer

In a situation where the source channel is digital, and the target channel analog or digital, the buffers in the digital signal path can be used to reduce the perceived switch time. As illustrated by FIGS. 2 and 4, the buffers 203 and 207 will have some audio/video buffered. In the situation of video, buffer 203 can have as much as 200-400 msec. worth of video left before the buffer is empty. This data can be played while the tuner 200 is tuning, thus to cover up the tune itself. This would mean that the output of the tuner is temporarily switched off (or ignored), while the video and audio decoders keep playing the contents of their respective buffers. In FIG. 5 this means that a switch at time 502 will lead to a time 504 of presentation until the screen goes black. This is further illustrated in FIG. 5. The total time that the data can still be played is the so-called 'ending delay', which is 503 in FIG. 5.

As shown in FIG. 10, the normal procedure taken by receiver control software 1003 when switching from a digital channel to another (analog or digital) channel is first switching off the video and audio decoders 204, 208 as shown by label 1001, thus having no video (black) on the screen and silence on the output (speakers).

For the switch to digital case, only after the decoders 204, 208 have been switched off, the control software 1003 instructs the tuner/demodulator to retune to the new desired frequency and achieve QAM-lock, as illustrated by label 1002. After the modulator 201 has achieved QAM lock, the demux 202 starts receiving a valid signal, and will be instructed by the control SW to filter required data, video, and audio packets. Subsequently, the control SW will switch on the video and audio decoders 204, 208 which will start producing audio/video (after the buffers 203, 207 are sufficiently full).

For the switch to analog case, the situation is similar, as shown in FIG. 11. Only after the decoders 204, 208 have been switched off, the control software 1003 instructs the tuner 200 to retune to the new desired frequency. After tuning is complete, the analog video and audio processors 301, 302 start receiving a valid signal, and will immediately start producing video and audio. As soon as the tune is complete, the control software will instruct the switches 304 and 303 in the backend to switch the output signals to the output of the analog audio/video processors (via control 1003 as depicted in the FIGURE).

The common channel change procedure just described is disadvantageous since the output is set to black/silence while there still is valid video and audio data in the decoder input buffers (whether the switch is from digital to digital or from digital to analog). An illustrative embodiment of the present invention exploits the presence of this data by not resetting the decoders 204 and/or 208 before starting the tune. Essentially, all steps as just described remain the same, except the audio and video decoders will not be switched off (i.e., step 1001 is omitted). This means that the audio/video decoders will keep playing, (potentially as much as half a second, or even more) until their input buffers are empty. At that point the output signals would go to black/silence due to absence of data.

Method 3 (General): Avoiding Video 'Jump' in A/D or D/A Switch

Usually, when switching from a digital channel to an analog one the other way around, the video might 'jump', caused by losing synchronization, which is disadvantageous to the viewer's experience. This jump is even visible when the video itself is black. In analog video signals, the video sync is taken from the input signal itself. In the digital case, the receiver has to generate the synch itself. These two different synch signals are most likely not exactly aligned, meaning that the end of one frame at one signal is when the other synch signal is in the middle of refreshing a frame, leading to the 'jump' in the screen.

One option is to force the receiver to use its own generated synch signal for the analog video as well. Another option is to only turn on the video backend (renderers) when the synch is in the invisible region (so-called VBI—Vertical Blanking Interval).

Method 4 (General): Audio Ramp Down/Up

Similarly, when tuning to another signal, audio might cause some audible artifacts due to the sudden switch-off of the signal. This can be masked by a ramp-down just before the desired switch, and a ramp-up just after the switch is complete. The ramp-down/up periods could be as short as $1/10^{th}$ of a second as indicated in FIG. 7, where the actual start of tune is indicated by 701.

System for Personalized Messaging

In situations such as personalized advertising/messaging, one (digital) channel can carry one or more messages, one of which can be used to overlay the message on another (main) analog or digital channel. The exact message to play will be decided by the receiving equipment. This system is disclosed in FIG. 8. The system depicted typically is part of a broadcast headend. This headend receives a network feed 801 (analog or digital) coming from the content provider. This feed contains television programming 800. The programming also contains messages 803, such as commercial. Furthermore, the programming contains so-called cue-tones 802 that indicate the start of a message 803.

To support message replacement by the receiver at the consumer home, the headend contains a cue-tone detector 804 that detects the cue-tones 802 in the source programming. The cue-tone detector passes the incoming stream on virtually unchanged. The only change is that it takes out the cue-tone 802 and optionally replaces it by another trigger message 810 that can be used by the receiver in the consumer's homes to detect the switch moment. Cue-tone 810 might even be identical to 802, in which case nothing is changed in the stream.

In case channel 800 is analog, message 810 is typically encoded as VBI data, audio tones, or other analog encoded data. Another possibility is to use time-based switching, in which case the receivers have a clock and the network will generate time-stamped switching instructions that are sent ahead of time to the receivers. The receivers will receive these instructions, and execute the switch on the exact time specified in the instruction. This approach docs require clock synchronization between central clocks and receiver clocks. There are several (well known) methods of doing this, such as: "slaving" all receiver clocks to a central master clock (as is done in some Access Control systems), constantly measuring the "drift" in the various receiver clocks and adjusting the system for it, etc,.

In case channel 800 is digital, message 810 can be encoded in many different ways. In MPEG-2 systems the message can be encoded as private data, an MPEG splice-point message, etc. If the receiver has no capability of decoding any of these messages, there is again the option of using time-based return switching in which the receivers receive time-stamped return-switching instructions.

In personalized messaging it is advantageous to place alternative messages on a separate channel as also depicted in FIG. 8. This way, the alternative channel can be shared for overlaying messages over many different channels. In FIG. 8 this is accomplished by the cue-tone detector providing playout triggers 805 to a digital server 806 which has the alternative messages stored on disk 807. When receiving a playout trigger, the digital server takes the appropriate message from its storage and plays it out on the separate channel 809.

The cue-tone detector and digital server are synchronized such that the alternative message 811 falls within the time window of message 803 in the main programming. Note that message 811 might be shorter than message 803, to allow for switching by the receiver from the main program to the alternative message, and back (without loosing content). Each switch might be up to 2 sec. as explained before. Also, some extra time might be added to allow for streams 808 and 809 to be drifting, e.g., because they are generated using a slightly different clock. In total, the amount of time the alternative message is shorter than the message that is overlaid in the main program is determined by the worst case situation, that has to be measured in the field with the deployed receivers.

Digital server 806 will insert a separate trigger message 812 in the channel that is used by the receiver to switch back to the main programming channel after the alternative message is finished. Message 812 can be encoded in many different ways since channel 809 is digital. For example, in MPEG it can be encoded as private data or any other type of data that can be detected by the receiver.

All television channels, including the ones just discussed, are subsequently combined and positioned as the right frequency in the frequency spectrum by combiners/upconverters 815. The resulting RF signal 816 is leaving the headend and passed on downstream, eventually reaching the receivers at the consumer's homes. Note that digital channels first pass through a modulator 814 that converts the digital bitstream into an analog signal.

Note that the system that has just been disclosed can be used in any situation where parts of a television program can be replaced by other parts that are located on one or more different channels.

Next, methods will be disclosed that can reduce the switching time by a receiver between streams 808 and 809 by preparing streams 809 ahead of time in the system as just described.

Method 5 (Specific): Sending Control Messages Ahead of Time

The first method consists of providing the basic control messages (such as PMT, PAT) for the new stream ahead of time (i.e., before the switch). This can be done in a number of ways.

One option is to standardize the content of the control messages in the receiver software (for instance in an MPEG-2 environment: always use fixed PIDs (packet Identifiers) for the destination digital stream in personalized messaging.

Another option is to send the content of the control messages to the receiver as part of the analog program, before the switch takes place (e.g. insert the control messages in the VBI data of the analog program).

Yet another option is to send the content of the control messages to the receiver via another link (e.g., in an MPEG-2 cable system via an out-of-band channel, in DTH system via phone modem).

This approach will ensure that the receiver does not have to wait for the messages to appear in the stream that has been switched to, saying up to 50 msec, of time.

Method 6: (Specific) Reduce Time Needed to Find Next I-Frame

The second method is ensuring that the video in the alternative message can be decoded right from the beginning. In an MPEG environment this means that the alternative messages starts with an I-frame. This saves the decoder from waiting for the next I-frame before it can begin its decoding process. This technique can save as much as 500 msec, of time. Since the alternative message can be prepared ahead of time, and insertion of the message is controlled b the trigger messages in the main program, this is readily achieved.

Method 7: (Specific) Reduce Required Buffer Fullness

The third method is ensuring that video presentation starts as soon as possible (low latency). This can be achieved by reducing the initial VBV-delay for the alternative message. This can be done by either (temporarily) increasing the bitrate of the video (so that the buffer is filled quicker), or by encoding the video such that it needs less data in the buffer before encoding (e.g., by forcing a lower-maximum VBV buffer size for the encoder). This invention can save as much as 200 msec. This would mean in FIG. 4 that the initial ramp-up will take a shorter amount of time, either because the ramp-up is steeper (higher bitrate) or by the encoder encoding the video such that the buffer is less full in the beginning.

Together, methods 5-7 can lead to a saving of up to 750 msec, which is considerable. Method 2, in addition, can lead to a saving of up 300 msec. Thus, the total time needed for the switch can be reduced with more than a full second by employing methods 2,5,6,7 together. This can be achieved without any hardware modifications of existing receivers.

Method 8: (Specific) Switch Back to a Scramble Program

To descramble a digital stream certain control messages must be received before actual descrambling (and, consequently, video/audio presentation) can start. Examples of such messages are control words such as ECMs and EMMs (Entitlement Control Messages and Entitlement Management Messages).

Descrambling has an impact on Digital-to-Digital Switching, specifically if the original digital channel is scrambled. If a receiver switches to a scrambled stream, in addition to the steps discussed earlier, it will need some time to receive the Broadcast Access Control messages in the stream (which it needs for descrambling). This causes additional switching delay. An example of this occurs when the receiver is playing a scrambled stream, switches over to another stream to play out a personalized message (unscrambled), and then switches back to the original stream (at which point the additional delay will occur).

Figure 9:
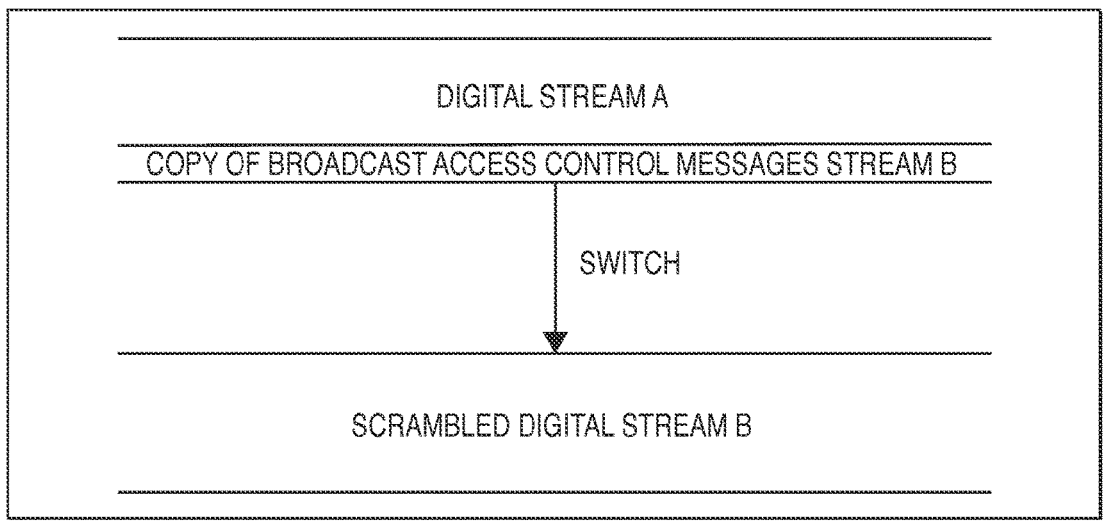
FIG. 9 illustrates duplication of access control messages.

There are several ways of solving this issue. The preferred solution would be to ensure that the receiver, before switching from a stream A to a scrambled stream B, already has access so the Broadcast Access Control messages for stream B. This can be done by sending these messages via an electronic link (like a modem) to the receiver and storing them there until needed. Another approach is to simply embed (copy) the Broadcast Access Control messages from stream B in the original stream A. This is illustrated in FIG. 9. This will ensure that the receiver will incur no additional delay in waiting for the Broadcast Access Control messages, and therefore no additional switching delay is visible to the viewer(s).

In a situation where it is desired that the alternative messages are also scrambled, it is a good option to scramble them using the same control words as used in the main program. This way, the receiver can switch back and forth between the channels without delays (since the same scrambling is used).

Each of the described methods provides some optimization of interstream switching. The present invention includes any possible permutation or combination of these methods. An illustrative embodiment of the present invention for optimizing switching from an analog to a digital channel includes the combination of methods 3, 4, 5, 6 and 7. An illustrative embodiment of the present invention for optimizing switching from a digital channel to an analog channel includes the combination of methods 2, 3 and 4. An illustrative embodiment of the present invention for optimizing switching from a digital to another digital channel includes the combination of methods 2, 3, 4, 5, 6 and 7. In case that the digital channel is scrambled, then method 8 may be included to optimize the switching.

Although the invention has been shown and described with respect to illustrative embodiments thereof, various other changes, omissions and additions in the form and detail thereof may be made therein without departing from the spirit and scope of the invention. It will understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A method comprising:
   tuning a receiver to a first digital channel via a tuner of the receiver;
   storing digital encoded media received from said first digital channel in an encoded media buffer;
   decoding output from the encoded media buffer to produce a decoded media stream;
   presenting the decoded media stream on a television screen operably coupled to the receiver;
   responsive to at least one of a trigger and a time-based switching instruction, initiating a switching of said tuner to a second channel while continuing to decode the output from the encoded media buffer until the buffer is empty thereby presenting the decoded media stream on the television during the switch from the first channel to the second channel, the second channel occupying a different frequency band than the first digital channel, wherein output from the tuner is switched off or ignored after initiating the switching of said tuner to the second channel and during the switch from the first channel to the second channel;
   after a passage of time for said tuner to complete switching to said second channel, storing digital encoded media received from said second channel in the encoded media buffer, wherein said passage of time for said tuner to complete switching to said second channel is a predetermined amount of time and a quantity of digital encoded media in said encoded media buffer is maximized to cover a maximal amount of said predetermined amount of time; and
   decoding and presenting, from the encoded media buffer, the digital encoded media received from said second channel.

2. The method of claim 1 wherein said second channel is a digital channel, and said step of outputting said second channel from said tuner includes commencing input of digital encoded media from said second channel to said encoded media buffer.

3. The method of claim 1 wherein said second channel is an analog channel, and said step of outputting said second channel from said tuner includes bypassing said encoded media buffer.

4. The method of claim 1 further including: before said step of initiating the switching of said tuner to said second channel, decreasing audio volume for said first channel; and after completing the switching of said tuner to said second channel, increasing audio volume for said second channel.

5. The method of claim 1 further comprising sending at least one control message for said second channel to said receiver at a time before said step of initiating the switching of said tuner to said second channel.

6. The method of claim 1 wherein said media is video, MPEG encoded video, audio, MPEG encoded audio, or AC-3 encoded audio.

7. The method of claim 2 wherein said media is digital video.

8. A receiver, comprising:
   a tuner configured to select one channel from multiple channels received by said receiver;
   a digital encoded media buffer operably coupled to said tuner;
   a decoder operatively coupled to the digital encoded media buffer, and
   at least one processor operably coupled to the tuner, the digital encoded media buffer and the decoder, the at least one processor being configured to:
   tune the receiver to a first digital channel via a tuner of the receiver,
   store digital encoded media received from in the encoded media buffer,
   decode output from the encoded media buffer to produce a decoded media stream;
   present output from the decoder on a television screen operably coupled to the receiver,
   responsive to at least one of a trigger and a time-based switching instruction, initiating a switch of said tuner to a second channel while continuing to decode the output from the encoded media buffer until the buffer is empty, thereby presenting the decoded media stream on the television during the switch from the first channel to the second channel, the second channel occupying a different frequency band than the first digital channel, wherein output from the tuner is switched off or ignored after initiating the switch of said tuner to the second channel and during the switch from the first channel to the second channel,
   storing digital encoded media received from said second digital channel in the encoded media buffer; and
   decoding and presenting, from the encoded media buffer, the digital encoded media received from said second channel after a passage of time for said tuner to complete switching to said second channel, wherein said passage of time for said tuner to complete switching to said second channel is a predetermined amount of time and a quantity of digital encoded media in said encoded media buffer is maximized to cover a maximal amount of said predetermined amount of time.

9. The receiver of claim 8 wherein said second channel is an analog channel, and output from said tuner bypasses said digital encoded media buffer.

10. The receiver of claim 8 wherein a quantity of digital encoded media in said encoded media buffer is maximized to cover a maximal amount of switching time required by said tuner.

11. The receiver of claim 8 wherein audio output from said receiver is decreased in volume while said tuner is switching to said second channel.

12. The receiver of claim 8 wherein said media is digital video.

13. The receiver of claim 12 wherein said second channel is an MPEG encoded channel, and said second channel is created such that when said digital encoded buffer receives digital encoded media for said second channel, the first input into said digital encoded buffer is an MPEG I-frame.

14. The receiver of claim 12 wherein said digital video for said second channel is previously encoded such that a VBV-delay of a first video frame in presentation order in said digital encoded buffer is reduced.

15. The receiver of claim 14 wherein said VBV-delay of a first video frame in presentation order is reduced by increasing the video bitrate.

16. The receiver of claim 14 wherein said VBV-delay of a first video frame in presentation order is reduced by reducing a VBV buffer size maximum value for an encoder.

17. The receiver of claim 8 wherein at least one control message for said second channel is sent to said receiver at a time before said tuner has completed switching to said second channel.

18. The receiver of claim 8 wherein said media is video, MPEG encoded video, audio, MPEG encoded audio, or AC-3 encoded audio.

19. A receiver, comprising:

a first tuner and a second tuner; and at least one processor operably coupled to the first tuner and the second tuner, the at least one processor being configured to:

tune the first tuner to a first channel;

cause the output of first media output received from the first tuner to a television screen;

tune the second tuner to a second channel while continuing to cause the output of the first media output thereby presenting the first media output on the television screen during a switch from the first channel to the second channel, the second channel occupying a different frequency band than the first channel, wherein output from the second tuner is switched off or ignored after initiating the switch of said tuner to the second channel and during the switch from the first channel to the second channel;

monitor for a stable signal of the second channel at the second tuner; and responsive to at least one of a trigger and a time-based switching instruction, cause the output of second media output received from the second tuner on the television screen responsive to the stable signal at the second tuner.

20. The receiver of claim 19, wherein causing the output of the first media output and causing the output of the second media output comprises at least one of:

presenting the output of the first media output and the output of the second media output on a television screen operably coupled to the receiver, and storing the output of the first media output and the output of the second media output as digital encoded media in an encoded media buffer.

21. The receiver of claim 19, wherein the first media output and the second media output comprises video, MPEG encoded video, audio, MPEG encoded audio, or AC-3 encoded audio.

22. The receiver of claim 19, wherein the first tuner and the second tuner comprise at least one digital tuner and at least one analog tuner.

* * * * *